US009697999B2

(12) United States Patent
Makarov et al.

(10) Patent No.: US 9,697,999 B2
(45) Date of Patent: Jul. 4, 2017

(54) MASS SPECTROMETER VACUUM INTERFACE METHOD AND APPARATUS

(71) Applicant: Thermo Fisher Scientific (Bremen) GmbH, Bremen (DE)

(72) Inventors: Alexander Alekseevich Makarov, Bremen (DE); Lothar Rottmann, Ganderkesee (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 14/364,639

(22) PCT Filed: Dec. 12, 2012

(86) PCT No.: PCT/EP2012/075302
§ 371 (c)(1),
(2) Date: Jun. 11, 2014

(87) PCT Pub. No.: WO2013/087732
PCT Pub. Date: Jun. 20, 2013

(65) Prior Publication Data

US 2014/0331861 A1 Nov. 13, 2014

(30) Foreign Application Priority Data

Dec. 12, 2011 (GB) .................................. 1121291.7

(51) Int. Cl.
*G01N 24/00* (2006.01)
*H01J 49/04* (2006.01)
(Continued)

(52) U.S. Cl.
CPC ........ *H01J 49/0495* (2013.01); *H01J 49/067* (2013.01); *H01J 49/105* (2013.01); *H01J 49/26* (2013.01)

(58) Field of Classification Search
None
See application file for complete search history.

(56) References Cited

U.S. PATENT DOCUMENTS 4,341,662 A 7/1982 Pfefferle
5,625,185 A 4/1997 Laser
(Continued)

FOREIGN PATENT DOCUMENTS

GB 2 293 482 A 3/1996
GB 2470287 A 11/2010
(Continued)

OTHER PUBLICATIONS

Chen, N. et al. An excellent fluoride sorption behavior of ceramic adsorbent, 2010, Journal of Hazardous Materials, vol. 183, pp. 460-465.*
(Continued)

*Primary Examiner* — Robert Xu
(74) *Attorney, Agent, or Firm* — David A. Schell; Charles B. Katz

(57) ABSTRACT

A method of preparing or operating a mass spectrometer vacuum interface comprising a skimmer apparatus having a skimmer aperture and an internal surface of the skimmer apparatus, comprising disposing an adsorbent or getter material on the internal surface. The internal surface has a deposition region where matter from plasma flows may be deposited and the material is disposed on part or all of the deposition region. The disposing step may be performed before a first use and/or intermittently, especially to refresh a previously disposed material. Providing such material serves to trap or collect deposition matter which might anyway be deposited but in such a way that subsequent liberation of that matter is prevented or at least reduced.

22 Claims, 6 Drawing Sheets

(51) Int. Cl.

| | |
|---|---|
| ***H01J 49/06*** | (2006.01) |
| ***H01J 49/10*** | (2006.01) |
| ***H01J 49/26*** | (2006.01) |

(56) References Cited

U.S. PATENT DOCUMENTS

| | | | |
|---|---|---|---|
| 2003/0146378 | A1 | 8/2003 | Mordehai |
| 2005/0194530 | A1 | 9/2005 | Thakur |
| 2008/0116371 | A1 | 5/2008 | Wouters et al. |

FOREIGN PATENT DOCUMENTS

| | | | |
|---|---|---|---|
| JP | S64-20669 | A | 1/1989 |
| JP | S64-45049 | A | 2/1989 |
| JP | H11-025903 | | 1/1999 |

OTHER PUBLICATIONS

Morgan Technical Ceramics, "Advanced Materials—90-98% Alumina (AL203)", http://www.morgantechnicalceramics.com/materials/alumina-al203/90-98-alumina, (no date), pp. 1-9.

* cited by examiner

MASS SPECTROMETER VACUUM INTERFACE METHOD AND APPARATUS

FIELD OF THE INVENTION

The invention relates to an atmosphere-to-vacuum interface of a mass spectrometer, and method, for use principally with a plasma ion source, such as an inductively coupled, microwave-induced, or laser-induced plasma ion source. Such an interface can also be referred to as a plasma-vacuum interface. The following discussion will focus on embodiments using inductively coupled plasma mass spectrometry (ICP-MS).

BACKGROUND OF THE INVENTION

The general principles of ICP-MS are well known. ICP-MS instruments provide robust and highly sensitive elemental analysis of samples, down to the parts per trillion (ppt) range and beyond. Typically, the sample is a liquid solution or suspension and is supplied by a nebulizer in the form of an aerosol in a carrier gas; generally argon or sometimes helium. The nebulized sample passes into a plasma torch, which typically comprises a number of concentric tubes forming respective channels and is surrounded towards the downstream end by a helical induction coil. A plasma gas, typically argon, flows in the outer channel and an electric discharge is applied to it, to ionize some of the plasma gas. A radio frequency electric current is supplied to the torch coil and the resulting alternating magnetic field causes the free electrons to be accelerated to bring about further ionization of the plasma gas. This process continues until a steady plasma state is achieved, at temperatures typically between 5,000K and 10,000K. The carrier gas and nebulized sample flow through the central torch channel and pass into the central region of the plasma, where the temperature is high enough to cause atomization and then ionization of the sample.

The sample ions in the plasma next need to be formed into an ion beam, for ion separation and detection by the mass spectrometer, which may be provided by a quadrupole mass analyser, a magnetic and/or electric sector analyser, a time-of-flight analyser, or an ion trap analyser, among others. This typically involves a number of stages of pressure reduction, extraction of the ions from the plasma and ion beam formation, and may include a collision/reaction cell stage for removing potentially interfering ions.

The first stage of pressure reduction is achieved by sampling the plasma through a first aperture in a vacuum interface, typically provided by a sampling cone having an apertured tip of inner diameter 0.5 to 1.5 mm. The sampled plasma expands downstream of the sampling cone, into an evacuated expansion chamber. The central portion of the expanding plasma then passes through a second aperture, provided by a skimmer cone, into a second evacuation chamber having a higher degree of vacuum. As the plasma expands through the skimmer cone, its density reduces sufficiently to allow extraction of the ions to form an ion beam, using strong electric fields generated by ion lenses downstream of the skimmer cone. The resulting ion beam may be deflected and/or guided onwards towards the mass spectrometer by one or more ion deflectors, ion lenses, and/or ion guides, which may operate with static or time-varying fields.

As mentioned, a collision/reaction cell may be provided upstream of the mass spectrometer, to remove potentially interfering ions from the ion beam. These are typically argon-based ions (such as $Ar^+$, $Ar_2^+$, $ArO^+$), but may include others, such as ionized hydrocarbons, metal oxides or metal hydroxides. The collision/reaction cell promotes ion-neutral collisions/reactions, whereby the unwanted molecular ions (and $Ar^+$) are preferentially neutralized and pumped away along with other neutral gas components, or dissociated into ions of lower mass-to-charge ratios (m/z) and rejected in a downstream m/z discriminating stage. U.S. Pat. Nos. 7,230,232 and 7,119,330 provide examples of collision/reaction cells used in ICP-MS.

The ICP-MS instrument should preferably satisfy a number of analytical requirements, including high transmission, high stability, low influence from the sample matrix (the bulk composition of the sample, including, for example, water, organic compounds, acids, dissolved solids, and salts) in the plasma, and low throughput of oxide ions or doubly charged ions, etc. These parameters can be highly dependent upon the geometry and construction of both the sampling cone and the skimmer cone, as well as subsequent ion optics.

In view of the increasingly routine use of ICP-MS, the throughput of the instrument has become one of the most important parameters. The need for maintenance, cleaning and/or replacement of parts can reduce the working time of an instrument and thereby affect its throughput. This parameter depends strongly on memory effects caused by the deposition of material from previous samples, along the whole length of the instrument from sample input to detector, but in particular on the glassware of the plasma torch and on the inner and outer surfaces of the sampling cone and of the skimmer cone. The effect on the skimmer cone becomes more significant in instruments using more enclosed or elongated skimmer cones, as, for example, in U.S. Pat. Nos. 7,119,330 and 7,872,227 and Thermo Fisher Scientific Technical Note Nr. 40705.

It would therefore be desirable to provide a way of either reducing such deposition, or reducing the effect of such deposition, on the instrument so that the resulting loss of throughput may be reduced. The invention aims to address the above and other objectives by providing an improved or alternative skimmer cone apparatus and method.

SUMMARY OF THE INVENTION

According to one aspect of the invention, there is provided a method of operating a mass spectrometer vacuum interface comprising a skimmer apparatus having a skimmer aperture and downstream ion extraction optics, the method comprising: skimming an expanding plasma through the skimmer aperture, and separating within the skimmer apparatus a portion of the skimmed plasma adjacent the skimmer apparatus from the remainder of the skimmed plasma by providing means to prevent (i.e., inhibit or impede) the separated portion from reaching the ion extraction optics while allowing the remainder to expand towards the ion extraction optics. The skimmer apparatus is preferably a skimmer cone having a cone aperture.

As mentioned above, some of the material comprised within the plasma being skimmed by the skimmer apparatus may be deposited on the skimmer apparatus; in particular, on the internal surface of the skimmer apparatus, i.e. surfaces including the downstream surface of the skimmer apparatus. In particular, it has been found that considerable deposition occurs upon the downstream portion of the skimmer apparatus adjacent the skimmer aperture. Such deposited material can be problematic when subsequent plasmas are skimmed through the skimmer apparatus if the material is scattered, removed or otherwise liberated from the skimmer apparatus surface and is able to pass on through the device with that plasma, since subsequent analysis may be affected thereby. The inventors have realised that ions originating from such depositions on the skimmer apparatus surface are initially concentrated in a boundary layer of the plasma flow near the internal surface of the skimmer apparatus (rather than being spread or dispersed throughout the plasma expansion in the skimmer apparatus). Accordingly, separating a portion of the skimmed plasma adjacent the skimmer apparatus surface from the remainder of the plasma inside the skimmer apparatus allows for the removal of a large proportion of these deposition ions, to thereby discriminate significantly against such ions and offer reduced memory effects. By allowing the remainder of the plasma to continue to expand towards the downstream ion extraction optics, interaction and mixing between the boundary layer and the remainder of the plasma can advantageously be reduced or minimized, with the aim of reducing the number of previously deposited ions which pass downstream of the skimmer apparatus and into the ion extraction optics.

As will be understood, in view of the problem of skimmers having material deposited on the inside in use, this invention aims to prevent or reduce the extent to which such deposits can have contact with the plasma expanding towards the ion extraction optics at a later time and therefore to make them unable to contribute to the memory effects. That is, embodiments of the invention either trap deposition material at the location of deposition, or separate deposition material that is liberated (by various processes including interaction with the plasma) from a deposition region near or just downstream of the skimmer apparatus orifice, where it could block the orifice or be reintroduced into the plasma, for removal or trapping at a downstream region, further away. At the downstream region, the material may be deposited with much less contamination risk to the system: it does not disturb (or at least does so to a lesser extent) the fields in the ion extraction region; space constraints are less of an issue, which means more material may be deposited there without clogging the system; and, even if the material is liberated again, the potential for it to stream "backwards" (i.e., upstream or radially inwards) to influence measurements is much reduced.

The portion of the skimmed plasma which is susceptible to becoming contaminated with material previously deposited on the internal surface of the skimmer apparatus is removed or separated from the remainder of the skimmed plasma inside the skimmer apparatus. The separation takes place within the internal volume of the skimmer apparatus itself, so that the potentially contaminating material can be removed upstream of the ion extraction optics, which might otherwise draw in undesired, non-sample ions for downstream processing and analysis. In this way, the opportunity for such deposited matter to mix with the skimmed sample plasma before extraction is significantly reduced.

As will be appreciated, the expanding plasma which is skimmed by the skimmer apparatus has typically passed through a sampler apparatus (e.g., a sampling cone) first. The sampling apparatus is the typical component which interfaces with the plasma source, at atmospheric, or relatively high, pressure. The pressure of the expanding plasma arriving at the skimmer apparatus is therefore reduced; typically to a few mbar.

According to a further aspect of the invention, there is provided a skimmer apparatus for a mass spectrometer vacuum interface comprising: a skimmer apparatus having an internal surface and a skimmer aperture for skimming plasma therethrough to provide skimmed plasma downstream of the skimmer aperture; and a plasma-separation means disposed on the internal surface of the skimmer apparatus for separating within the skimmer apparatus a portion of the skimmed plasma adjacent the internal surface of the skimmer apparatus from the remainder of the skimmed plasma while allowing the remainder to expand downstream.

The plasma-separation means is disposed or formed on, or associated with, the internal surface of the skimmer apparatus by being deposited thereon; adhered, attached or affixed thereto; or otherwise physically coupled, engaged or connected thereto. In this way, the passing boundary layer of skimmed plasma, comprising unwanted previously deposited matter, is subjected to an adsorbent region within the skimmer apparatus which acts to remove matter from the boundary layer. This separation takes place within the skimmer apparatus itself, so that the potentially contaminating material can be removed upstream of the ion extraction optics, thereby reducing the opportunity for such deposited matter to mix with and contaminate the skimmed sample plasma before extraction.

The skimmer apparatus is preferably a skimmer cone having a cone aperture. The term "cone" is used herein to refer to any body which comprises at least a generally conical portion at its upstream end, whether or not the remainder of the body is conical. The term "skimmer cone" is therefore to be understood as a body which performs a skimming function in a mass spectrometer vacuum interface and has a conical form at least at a region of its upstream, or atmosphere/plasma-facing, side.

According to a further aspect of the invention, there is provided a method of operating a mass spectrometer vacuum interface comprising a skimmer apparatus having a skimmer aperture and an internal surface, the method comprising: establishing an outwardly directed flow along the internal surface of the skimmer apparatus. Preferably, a channel-forming member is provided within the skimmer apparatus to establish the outwardly directed flow, which is preferably a laminar flow.

As used herein, outwardly directed flow means a flow directed generally downstream and/or radially outward from an axis of the skimmer cone apparatus. Hence in embodiments in which the skimmer apparatus comprises a cone aperture, an outwardly directed flow is established both downstream and radially outward from an axis of the skimmer cone apparatus as the flow is directed along the internal surface of the skimmer apparatus. In other embodiments in which the skimmer apparatus comprises an aperture in a planar surface, the planar surface being generally perpendicular to an axis of the skimmer cone apparatus, an outwardly directed flow is established radially outward from an axis of the skimmer cone apparatus as the flow is directed along the internal surface of the skimmer apparatus.

According to a further aspect of the invention, there is provided a method of preparing or operating a mass spectrometer vacuum interface comprising a skimmer apparatus having a skimmer aperture and an internal surface of the skimmer apparatus, the method comprising the step of disposing an adsorbent or getter material on the internal surface. Preferably, the internal surface comprises a deposition region where matter from previous or present plasma flows may be deposited and the material is disposed on at least a part (more preferably all) of at least the deposition region of the internal surface. The disposing step may be performed intermittently to refresh a previously disposed material.

Providing an adsorbent or getter material on the internal surface has a number of beneficial effects. Firstly, it serves to trap or collect deposition matter which might anyway be deposited but in such a way that subsequent liberation of that matter is prevented or at least reduced. Secondly, when providing the material during operation of the skimmer apparatus, it serves to cover over or 'bury' matter which has been deposited on the internal surface of the skimmer apparatus up to that point, to effectively prevent or at least significantly hinder the subsequent liberation of that matter into the plasma flow. Thirdly, when providing a second or subsequent application of the material over a previously disposed adsorbent or getter material, it serves to refresh or rejuvenate the original provision of material on the internal surface of the skimmer apparatus, to help to maintain the adsorptive/trapping effect.

According to a further aspect of the invention, there is provided a skimmer apparatus for a mass spectrometer vacuum interface, the skimmer apparatus comprising: an internal surface and a skimmer aperture for skimming plasma therethrough to provide skimmed plasma downstream of the skimmer aperture; and an adsorbent or getter material disposed on the internal surface of the skimmer apparatus.

Other preferred features and advantages of the invention are set out in the description and in the dependent claims which are appended hereto.

BRIEF DESCRIPTION OF THE DRAWINGS

The invention may be put into practice in a number of ways and some embodiments will now be described, by way of non-limiting example only, with reference to the following figures, in which.

DESCRIPTION OF PREFERRED EMBODIMENTS

Figure 1:
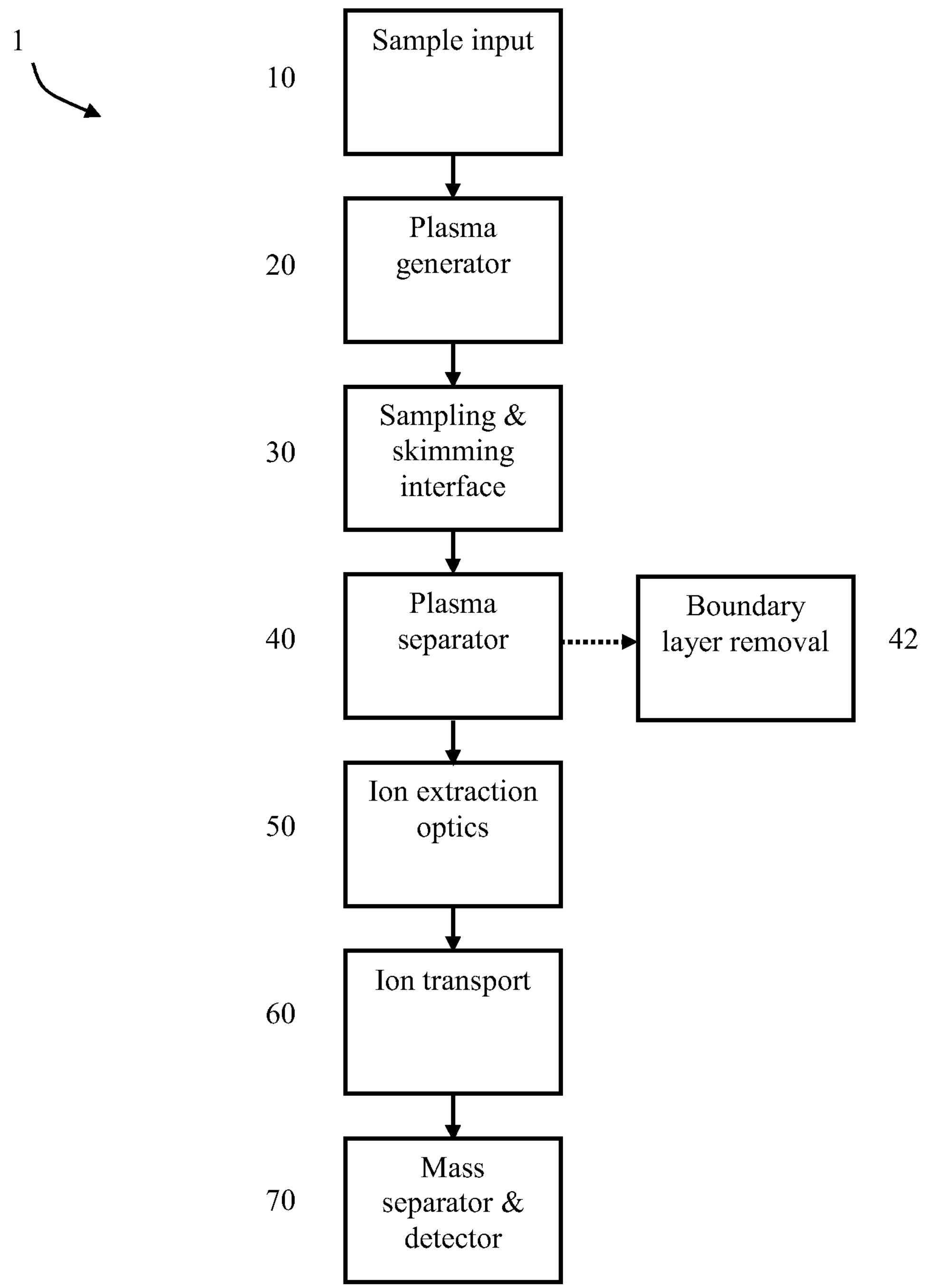
FIG. 1 shows schematically a mass spectrometer device in accordance with one embodiment of the invention.

Referring to FIG. 1, there is schematically shown a mass spectrometer device 1 in accordance with a first embodiment. A sample input 10 provides a sample to be analysed in a suitable form to a plasma generator 20. The plasma generator provides the sample in an ionised form in a plasma, for downstream processing and analysis. The plasma is sampled and taken into a progressively reduced-pressure environment by a sampling and skimming interface 30. Beyond this interface, the plasma is subjected to an ion extraction field by ion extraction optics 50, which draws positive ions from the plasma into an ion beam, repelling electrons and allowing neutral components to be pumped away. The ion beam is then transported downstream for mass analysis by ion transport 60, which may comprise static or time-varying ion lenses, optics, deflectors and/or guides. Ion transport 60 may also comprise a collision/reaction cell for the removal of unwanted, potentially interfering ions in the ion beam. From the ion transport 60, the ion beam passes to a mass separator and detector 70 for mass spectrometric analysis.

The above stages of the mass spectrometer device 1 may be generally provided as described in the background of the invention section, above; particularly with embodiments using inductively coupled plasma mass spectrometry. The plasma generator 20 may, however, be alternatively provided by a microwave-induced source or a laser-induced source.

In this embodiment, downstream of the entrance to the skimming interface but before the ion extraction optics 50, there is provided a plasma separator 40, for separating within the skimming interface the plasma passing downstream thereof. Some of the material comprised in a plasma expanding past the skimming interface can be deposited on the skimming interface itself. This may include sample ions as well as material from the sample matrix and the plasma generator. During analysis of one sample, deposited material from the analysis of a previous sample (or previous samples) may be liberated or escape from the skimming interface surface, typically as a result of particle bombardment of the deposited material by the plasma and other matter flowing through the interface, or possibly by electron bombardment from electrons liberated downstream of the skimmer apparatus. The inventors have found that the ions released from previous depositions (the deposition ions) tend at least initially to be concentrated in a boundary layer of the plasma flow with the skimming interface surface. As such, the plasma separator 40 is provided within the skimming interface itself to separate the plasma expanding downstream of the skimming interface, so that a portion adjacent the skimming interface can be processed differently from the remainder of the skimmed plasma inside the skimming interface, which is allowed to continue to expand towards the ion extraction optics 50. In particular, the separated portion of the plasma is removed at boundary layer removal 42, so that any deposition ions comprised in that portion may not be taken up by the ion extraction optics 50 and interfere with downstream analysis. The removal of the boundary layer portion of the plasma flow provides a significant discrimination against the deposition ions, so that memory effects in the skimming interface may advantageously be reduced.

The plasma separator 40 may be arranged to cause a boundary layer portion of the plasma flow to be redirected away from the remainder of the plasma flow in the skimming interface which continues to expand towards the ion extraction optics 50. Alternatively, the plasma separator 40 may be arranged to collect matter in the boundary layer portion of the plasma flow, or at least the deposition ions comprised within that portion, to prevent further progress of the collected material downstream. Other methods and apparatus for plasma separation will be apparent to the skilled person in view of the present disclosure.

Figure 2:
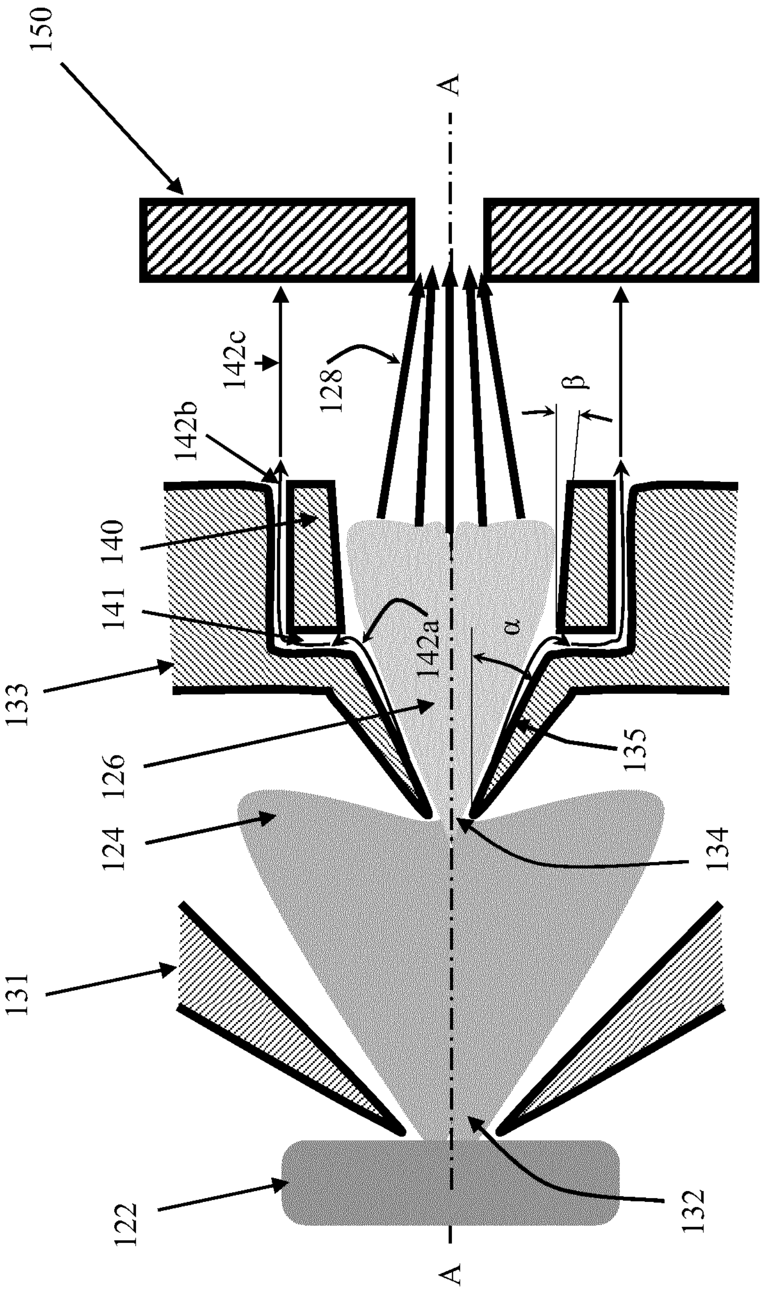
FIG. 2 shows part of a plasma ion source comprising a skimmer cone apparatus in accordance with another embodiment of the invention.

Referring to FIG. 2, there is shown a vacuum interface portion of a plasma ion source in accordance with a second embodiment of the invention. This figure shows an embodiment in which a boundary layer portion of the plasma flow is redirected away from the remainder of the plasma flow. Specifically, there is shown a sampling cone 131, a skimmer cone 133, and an extraction lens 150. Sampling cone 131 has a conical external surface and a conical internal (downstream) surface and provides a sampling aperture 132 at the intersection between the surfaces.

The skimmer cone 133 has a first, generally conical portion and a second, generally cylindrical portion. The conical portion has a conical external surface and a conical internal (downstream or back side) surface 135, at the intersection of which is provided a skimmer aperture 134. The conical portion merges into the generally cylindrical portion (the external surface of the skimmer cone may in some embodiments remain conical). The generally cylindrical portion has a generally cylindrical recess formed therein, to receive a generally ring-like member 140 in spaced relation thereto. The internal surface of the skimmer cone 133 at the generally cylindrical recess portion substantially complements the surface profile of the ring-like member 140. A channel 141 is formed between the recess and the ring-like member 140, to provide a separate flow path for gas passing through the skimmer cone 133.

Downstream of the skimmer cone 133, the ion extraction lens 150 is configured to draw out sample ions from the plasma into an ion beam along axis A, for downstream analysis, as shown by arrows 128. The channel 141 opens out at a downstream end of the skimmer cone 133, to be pumped by a suitably arranged vacuum pump. The location of the downstream channel opening is advantageously arranged towards or at a peripheral region of the extraction lens 150, to reduce or prevent ions exiting the channel 141 from being drawn through the extraction lens 150 by its extraction field.

In operation, a plasma 122 from an upstream plasma generator is sampled through the sampling aperture 132 of the sampler cone 131. The sampled plasma forms a plasma expansion 124, which is then skimmed through the skimmer aperture 134 of the skimmer cone 133. The skimmed plasma expansion 126, sometimes referred to as a secondary plasma expansion, is shown downstream of the skimmer aperture 134. As the plasma in the expansion 126 approaches the downstream end of the skimmer cone 133, the plasma becomes increasingly rarefied. The ion extraction lens 150 produces an extraction field which results in the formation of a stable double layer in the plasma, defining the plasma boundary or plasma edge, from which sample ions are extracted and focused by the extraction lens 150.

As discussed above, material from the skimmed or secondary plasma expansion 126 may be deposited on the internal skimmer surface 135. The build up of depositions over time leads to a general requirement for routine cleaning and/or replacement of the skimmer cone (and the sampling cone) in a plasma ion source mass spectrometer. In the meantime, previously deposited material may be liberated or released into the plasma expansion 126, typically as a result of particle bombardment from ions, gas or electrons within the plasma expansion, thereby introducing contaminant ions into the plasma. Such memory effects can potentially interfere with the analysis of the present sample, which is of course undesirable.

The inventors have found that these deposition ions, once released, tend to be carried or swept along—and therefore concentrated in—the flow of expanding plasma generally immediately adjacent the internal skimmer surface 135; that is, in a boundary layer of the plasma expansion with that surface inside the skimmer cone. The inventors have therefore recognised that removing this boundary layer would be advantageous, since it could also remove a significant proportion of the deposition ions from the plasma expansion.

As indicated by arrows 142*a-c*, the boundary layer of the plasma is separated from the remainder of the plasma expansion within the skimmer cone 133 by being diverted into the channel 141 formed between the skimmer cone 133 and the ring-like member 140. The separated portion of the plasma passes along the channel 141 to its downstream opening away from the region in which the extraction field of the ion extraction lens 150 is effective. The separated portion of the plasma may be pumped away from the channel opening by a vacuum pump; preferably, the vacuum pump which is conventionally employed to provide pressure reduction downstream of the skimming interface in a plasma ion source mass spectrometer. Alternatively to being pumped away, some of the deposition material exiting the channel opening could be deposited on downstream components, such as the ion extraction lens 150, but is in any case substantially prevented from becoming subject to the extraction field of the ion extraction lens 150.

The separation and removal of the boundary layer of the secondary plasma expansion 126 should preferably take place downstream of the region in which most of the deposition occurs, which is usually the first few millimetres or so of the internal surface 135 of the skimmer cone 133. In addition, the separation and removal should preferably take place upstream of the plasma boundary, under all operating conditions (e.g., for all samples and for all voltages on the extraction optics), to reduce or prevent ions originating from the depositions from being drawn into the ion extraction optics and subsequently detected.

In an alternative arrangement, the generally ring-like member 140 may be provided with one or more openings or channels which extend through the body of the member. In this way, the boundary layer of plasma may be diverted into the channel 141, as shown by arrows 142*a*, then be vented through the openings in the member. The member 140 may be dimensioned such that a channel is still formed between it and the skimmer cone recess, as shown by arrows 142*b*, in addition to the openings through the body of the member itself. Alternatively, the member 140 may be dimensioned to be accommodated within the skimmer cone recess without providing such intermediate channel, so that only the openings therethrough provide venting. Alternatively or additionally, the venting channel may be formed between one or more troughs formed in the external surface of the generally ring-like member 140 and the skimmer cone recess.

As shown in the embodiment of FIG. 2, the internal surface 135 of the skimmer cone 133 has a conical portion, at the downstream end of which is provided an annular wall which is generally transverse to the axis A. At the radially outer edge of the annular wall, there is provided a further wall, which has a reduced angle to axis A compared to that of the internal surface 135 of the skimmer cone 133; in one embodiment, such as that shown in FIG. 2, the further wall is generally cylindrical and generally coaxial with axis A. The further and annular walls together form the recess in which the ring-like member 140 is disposed. Preferably, the inner (hollow) diameter of the ring-like member 140 is greater than the diameter of the downstream end of the conical internal surface of the skimmer cone 133. This allows for the secondary plasma expansion 126 to expand through the skimmer cone 133, in particular without encountering any direct obstructions, such as baffles or the like.

However, a discrete, step-wise reduction of the cone angle (i.e., the angle of the surface of the generally conical, internal region of the skimmer cone 133, comprising the internal surface 135 and the internal surface of the member 140) interferes with free-jet expansion of the skimmed plasma. This leads to the formation of a shock wave downstream of channel 141—i.e., after the change in angle of the internal region—but still within member 140. The position of this shock wave is dependent on the internal diameter of the skimmer cone aperture 134, the skimmer cone geometry, etc., and it could change with time as the skimmer cone becomes contaminated. Nevertheless, the shock wave remains confined to the inner volume of member 140 and therefore the extraction conditions for ions from the plasma remain generally the same, thus ensuring high stability of the interface.

Preferably, the angle a of the conical portion of the internal surface 135 of the skimmer cone 133 to the axis A is between 15° and 30°; most preferably, 23.5° (the external conical surface of the skimmer cone 133 may also lie within a range of angles relative to the axis A, but is most preferably 40°). The angle β between the internal surface of the ring-like member 140 and the axis A preferably lies in the range $-\alpha/2<\beta<\alpha$ (so between −15° and +30°); most preferably 3°.

Conventional skimmer cones tend to have a conical internal surface throughout. In the embodiment of FIG. 2, taking the conical portion of the skimmer cone 133 and the region within the ring-like member 140 to be the effective expansion region, it can be seen that the expansion region is no longer conical throughout, but that there is a change in angle of $\alpha$-$\beta$ . Such a change in angle may result in a shockwave being formed by the plasma expansion in the skimmer interface. This is not considered to present a problem if the width of the channel 141 is sufficient to allow for any vortices formed near the internal surface 135 of the skimmer cone to be pumped away, without disruption to the flow of the plasma expansion generally along the axis A. Under these conditions, and as discussed above, the angles $\alpha$ and $\beta$ do not need to be the same.

Preferably, the inner diameter of the sampling cone aperture 132 is from 0.5 to 1.5 mm; most preferably 1 mm. Preferably, the inner diameter d of the skimmer cone aperture 134 is 0.25 mm to 1.0 mm; most preferably 0.5 mm. This aperture 134 may extend longitudinally to form a cylindrical channel up to 1 mm long. Preferably, the width of the channel 141 is one to two times the inner diameter d, and therefore lies in the range from 0.3 to 1 mm; most preferably 0.5 mm. Preferably, the distance from the tip of the skimmer cone 133 (i.e., the aperture 134) to the channel 141 is in the range of 14 to 20 times $d*\tan(\alpha)$, or between 1 and 6 mm; most preferably 3.5 mm. Preferably, the distance from the tip of the skimmer cone 133 (i.e., the aperture 134) to the downstream end of ring-like member 140 is in the range of 25 to 40 times $d*\tan(\alpha)$, or between 2 and 12 mm; most preferably 7.5 mm.

It will be appreciated that, while the embodiment of FIG. 2 shows the channel 141 as a radially fully open channel, this could be replaced with a number of individual channels distributed around the internal surface of the skimmer cone.

A further advantage of providing the channel 141, or a plurality of channels, is that this may allow for the regulation of heat flows along the skimmer cone. For example, the channel 141 might approach the outer surface of the skimmer cone 133 so closely from the inside that heat flow from the skimmer tip to the downstream base may be reduced.

The channel 141 does not need to have circular symmetry. For example, the function of boundary layer removal could be implemented by having a number of small pumping holes (like a "pepper-pot"), a number of slots, or using porous material, etc. Also, while venting of the boundary layer is advantageous for reducing memory effects, other functions could also be achieved using parts of the same construction. For example, while some of the pumping holes may be used for pumping away gas, others could be used for replacing removed gas with other gas; for example, reaction gases for bringing about ion-molecule reactions (e.g., helium, hydrogen, etc.) or for focusing the plasma jet expansion closer to the axis A and thus improving efficiency of ion extraction. In the former case, the reaction gas may be supplied from a dedicated gas supply, which could also be so for the latter case, or it could alternatively be sourced from the previous pressure region.

Preferably, such gas inlet is located slightly downstream from pumping holes, so that reaction gas may be well mixed up in the shock wave downstream. Unlike U.S. Pat. Nos. 7,119,330 or 7,872,227, such early introduction of reaction gas prior to shock wave allows to eliminate the need for an enclosed chamber with elevated pressure; that is, with this arrangement, there is no need to confine the plasma expansion, so no need for a fully or partially enclosed collision chamber. One further use for such gas inlets is to provide a 'backwards' flow of gas through the skimmer for cleaning purposes, especially when not processing a sample plasma.

Preferably, the ring-like member 140 is electrically neutral (relative to the skimmer cone 133, with which it is typically in conductive contact), so that it has no effect on, and is not affected by, the extraction field generated by the ion extraction optics 150. This is advantageous in helping to minimise the effect of the ion extraction optics on the ring-like member 140, with respect to its function of forming the channel(s) through which deposition ions may be removed.

As discussed above, any deposited matter which is liberated is at least initially concentrated in a boundary layer with the internal surface of the skimmer cone. In operation, providing the ring-like member to create a channel in the skimmer cone establishes a laminar flow over the internal surface of the skimmer cone. The laminar flow is a radially outward flow, from the entrance aperture of the skimmer cone towards the channel. This laminar flow provides a mechanism for carrying away liberated material in the boundary layer which has been previously deposited on the internal surface.

Figure 3:
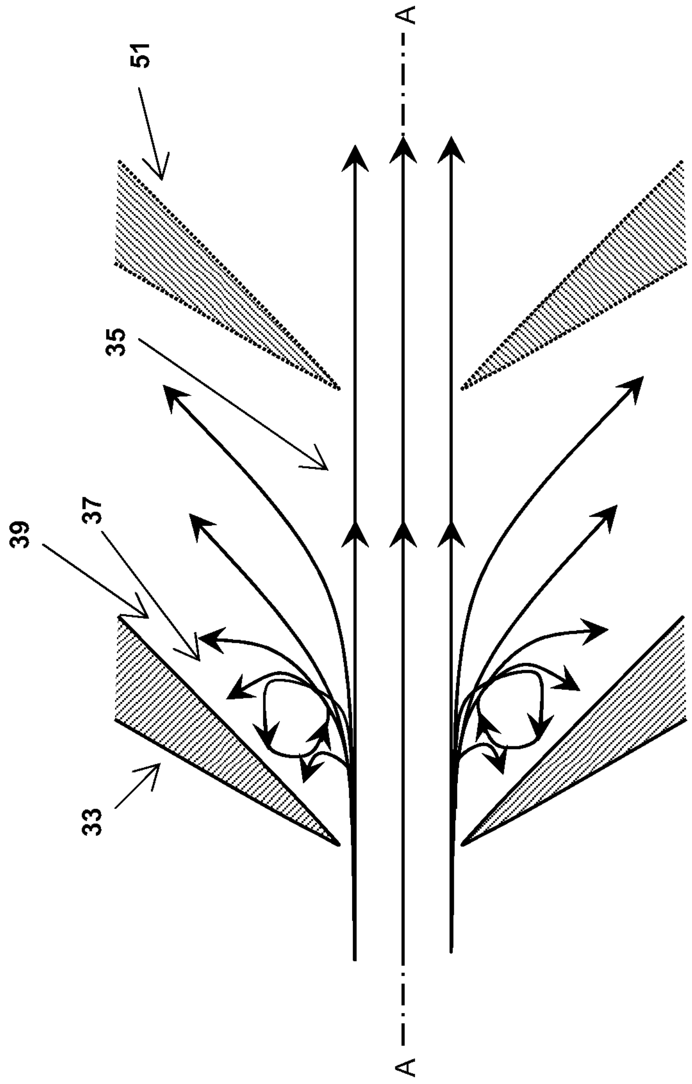
Fig. 3 Prior Art
FIG. 3 shows a schematic representation of the flow through a prior art skimmer cone.

However, a further advantage provided by this mechanism is a reduction in the deposition of material on the internal surface in the first place. The inventors understand that the deposition of material on the internal surface of a conventional skimmer cone is at least partly due to a zone of turbulent flow and/or a zone of relative "stillness" or "silence" within the skimmer cone, the turbulent flow typically including a back-flow of material at or near the internal surface, away from the axis. A schematic representation of this is shown in FIG. 3. This figure shows a skimmer cone 33 and ion extraction optics 51, with a generally axial/paraxial flow of sample plasma 35 therebetween. Along the downstream internal surface of the skimmer cone 33, some of the flow which does not pass through the ion extraction optics 51 may be turbulent flow 37 or relatively dead flow 39. Deposition of matter onto the internal surface is understood to arise at least in part because the matter in these flows 37, 39 remains near the internal surface of the skimmer cone for a relatively extended period of time.

Figure 4:
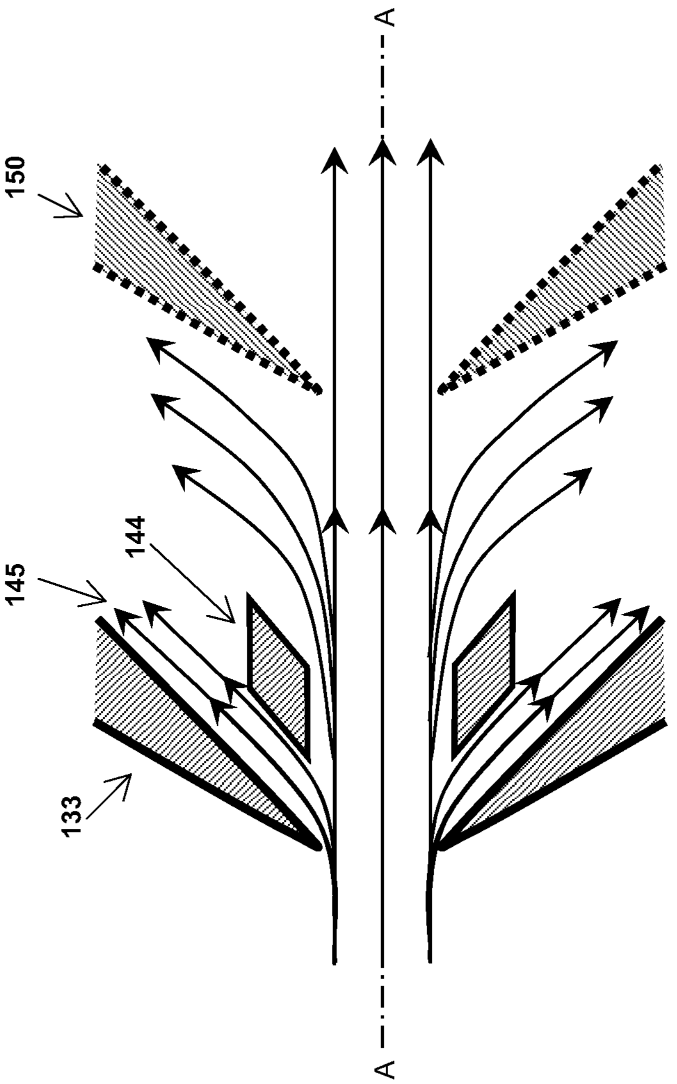
FIG. 4 shows a schematic representation of the flow through a skimmer cone according to one embodiment of the invention.

FIG. 4 shows a schematic representation of the flows with a skimmer cone according to an embodiment of the invention. In this embodiment, a skimmer cone 133, ion extraction optics 150, and a channel-forming member 144 are provided. It will be noted that skimmer cone 133 and the channel-forming member 144 are of different forms from the embodiment of FIG. 2. Here, the internal surface of the skimmer cone 133 remains conical throughout and the channel-forming member 144 is ring-like with conical inner and outer profiles at its upstream end. As will be appreciated, the function of the channel-forming member is to divide the region within the skimmer apparatus into a central region through which it is desired to pass sample plasma and an outwardly extending channel region adjacent the internal surface of the skimmer apparatus through which it is desired to pass liberated deposition matter.

The formation of a channel gives rise to a radially outward laminar flow 145. This flow 145 carries away liberated material, as explained above. However, with the laminar flow 145, the zones of turbulent flow and/or relatively dead flow have been removed, or at least displaced further downstream on the internal surface of the skimmer cone (depending on how far the channel-forming member extends downstream and on its geometry). The laminar flow results in the opportunity for material to be deposited on the internal surface of the skimmer cone being removed or significantly reduced, especially close to or just downstream of the cone entrance aperture. This in turn reduces the chances of deposited material being liberated from this region and mixing with the sample plasma.

This laminar flow may extend downstream over the first 0.1 mm, 0.2 mm, 0.5 mm, 1 mm, 2 mm or 5 mm from the skimmer cone entrance aperture. This distance may be adjusted by changing the location of the channel-forming member within the skimmer cone and/or by adjusting the degree of pumping of the vacuum pump in the region. It will be appreciated that the skimmer cone geometry, the channel-forming member geometry and the pumping/flow rates may be optimised by the skilled person.

Figure 5:
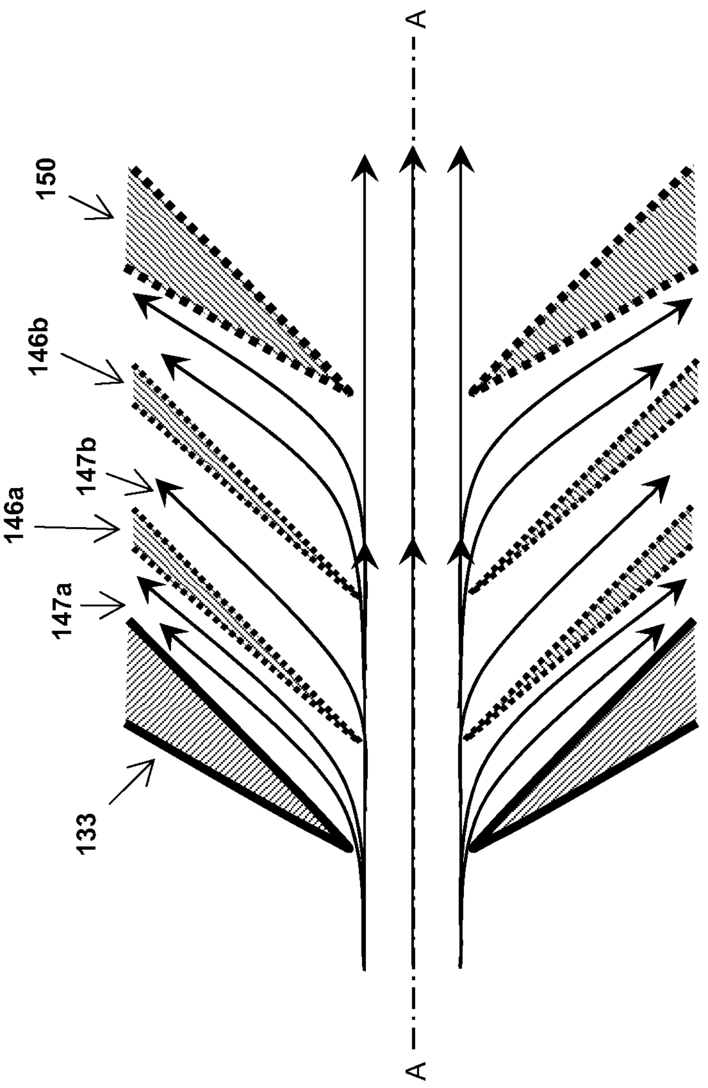
FIG. 5 shows a schematic representation of the flow through a skimmer cone according to another embodiment of the invention.

FIG. 5 shows a further embodiment of the invention, in which the channel-forming member is provided by two cones 146*a*, 146*b*, separated in the axial direction within the skimmer cone 133. A first channel 147*a* is thereby formed between the internal surface of the skimmer cone and the first channel-forming member 146*a* and a second channel 147*b* is formed between the first channel-forming member 146*a* and the second channel-forming member 146*b*. The second channel provides a second laminar flow for additional removal of undesired material.

Figure 6:
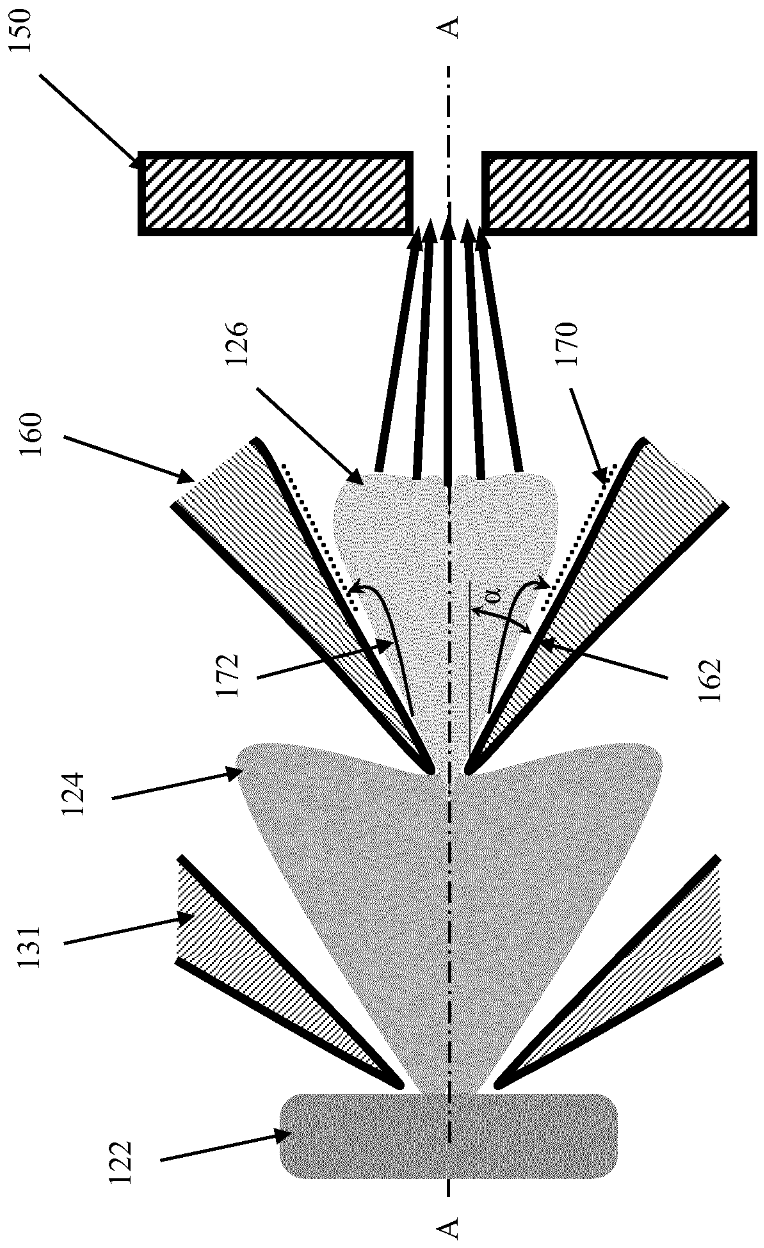
FIG. 6 shows part of a plasma ion source comprising a skimmer cone apparatus in accordance with a further embodiment of the invention.

Referring to FIG. 6, there is shown an alternative arrangement for the skimmer cone apparatus, in accordance with a third embodiment of the invention. This figure shows an embodiment in which the plasma separator is arranged to collect material from the boundary layer portion of the plasma flow, or at least the deposition ions comprised within that portion, within the skimmer cone. The portion of the instrument shown in FIG. 6 is generally the same as that shown in FIG. 2, so like items are referred to with the same reference numerals. In the embodiment of FIG. 6, the plasma separator is provided by a collector mechanism, instead of a diverter mechanism. Specifically, skimmer cone 160 has a generally conical internal surface 162 and at or towards a downstream end there is distributed an adsorbent material 170. A porous material, such as metal (preferably, titanium getter, especially when applied by titanium sublimation or sputtering), evaporable or non-evaporable getters, glass or ceramics, is preferably used as the adsorbent material. Other suitable materials include zeolites, possibly with a getter material, getter-covered sponges, aluminium sponge, and, if operated in the absence of oxygen, even carbon or activated carbon. As will be appreciated, the adsorbent material 170 may be disposed on the internal surface 162 in a number of ways, depending in particular on the type of material employed. The material may form a layer or coating on the internal surface; for example, by sintering, chemical or physical vapour deposition, or other chemical or electrochemical techniques. Alternatively, the material may be mechanically adhered, affixed or bonded to the internal surface.

Similar to the previous embodiment, a plasma 122 is sampled through sampler cone 131 and forms a plasma expansion 124 downstream thereof. The plasma is then skimmed by skimmer cone 160 and forms a skimmed or secondary plasma expansion 126 downstream thereof. Ion extraction optics 150 generate an extraction field which draws out ions from the plasma to form an ion beam for subsequent analysis.

Material depositions from previous sample analyses can build up on the internal surface 162 of the skimmer cone 160, leading to the problem of memory effects. The release of previously deposited or deposition ions from this region is understood to be concentrated in a plasma boundary layer of the skimmed or secondary plasma expansion 126. The deposition material comprised within the boundary therefore encounter the adsorbent material 170 and is collected onto or into it, thereby removing the deposition material from the plasma expansion inside the skimmer cone. This is shown schematically by arrows 172. The remaining plasma is allowed to expand throughout the skimmer cone 160 and the sample ions comprised in that remainder are then extracted by the ion extraction optics 150 for onward transmission through the instrument.

One of the mechanisms for removal of the deposited material is accelerated diffusion; e.g., through porous material like zeolites or other nano-structured materials made from metal, glass or ceramics. This diffusion is facilitated by the elevated temperature of the skimmer cone in operation.

In one embodiment, the working life of the collector means (or the time before the skimmer apparatus needs to be cleaned or replaced) may be extended by refreshing or rejuvenating the collector mechanism intermittently, between sample analyses. That is, the internal surface of the skimmer apparatus where the collector material is provided to catch liberated deposited matter may be covered with fresh collector material at given intervals. The additional covering is preferably a thin film of material, either as a monolayer or approaching monolayer thicknesses. The covering material is preferably applied by sputtering or by sublimation, by applying local heating to one or more filaments, rods or pellets of the material inside the skimmer apparatus, or by the mechanical introduction of the latter into the expanding plasma. Such application is preferably performed during a non-sample phase, or between analyses, such as during the uptake time of a sample or during a cleaning phase. Many getter/adsorbent materials may be used for this, but titanium is especially suited for this purpose, because it does not react with argon, which is typically used as the carrier gas and/or plasma gas in ICP sources. The above technique is known in vacuum technology, but it is not known to have been applied for the reduction of memory effects in this way.

This covering layer has two beneficial effects. Firstly, it serves to cover over or ‘bury’ any material which has been deposited on the internal surface of the skimmer apparatus, to effectively prevent or at least significantly hinder the subsequent liberation of that material into the plasma flow. Secondly, it serves to refresh or rejuvenate the original provision of adsorbent or getter material on the internal surface of the skimmer apparatus, to help to maintain the adsorptive/trapping effect.

While the embodiment of FIG. 6 describes the provision of an adsorbent or getter material 170 at or towards a downstream end of the internal surface of the skimmer cone, other embodiments of the invention alternatively or additionally have an adsorbent or getter material provided further upstream on the internal surface of the skimmer cone, close to or adjacent the skimmer cone entrance aperture. Indeed, an adsorbent or getter material may be provided on the entirety of the back side (internal surface) of the skimmer cone. It can be seen that providing such material close to the entrance aperture can have significant advantages, since it may be effective to trap or collect matter which would be deposited there and prevent or at least hinder it from being liberated in the first place (and therefore needing to be removed downstream).

Indeed, in one aspect of the invention, at least a first region of the internal surface of a skimmer apparatus is covered with an adsorbent or getter material. The first region comprises at least a part, or all, of the deposition region where matter from previous or present plasma flows may be deposited. The covering or layer of material may be applied prior to first use of the skimmer apparatus and/or intermittently during operation of the skimmer apparatus.

While the above embodiments have been described with the various components being generally concentrically arranged about axis A or equivalent, this need not be the case. There is no requirement for the sampling cone, the skimmer cone, the channel(s), or lens(es) to be axially symmetric; the same effect could be achieved for other cross sectional arrangements. For example, rather than making the embodiments of FIGS. 2, 4, 5 and/or 6 rotationally symmetric about the axis A, the arrangements could be extended along a direction normal to the plane of the drawings (so that the same cross section would be provided over a range of distances into and out of the plane of the drawings), with the effect that the “cones”, for example, form slots or “elliptical cones” instead. Although the preferred dimensions might be different in such an arrangement, the concept of the invention remains applicable, as the skilled person will readily appreciate.

As discussed, while the invention has been principally described with reference to embodiments employing inductively coupled plasma mass spectrometry (ICP-MS), the invention finds application with a number of ion sources. For example, embodiments may be implemented with atmospheric pressure ion sources where there are diaphragms (skimmers, apertured plates, electrodes, lenses etc.) present in regions of high sample flow/flux, such as ion sources for plasma ionisation, including argon ICP, helium ICP, microwave-induced plasma, and laser-induced plasma, and for electrospray ionisation and atmospheric pressure chemical ionisation. Examples include those in U.S. Pat. Nos. 5,756,994 and 7,915,580. Embodiments may also be implemented with ion sources using laser desorption, preferably MALDI (matrix-assisted laser desorption/ionisation) at atmospheric pressure, at reduced pressures, or at vacuum pressures.

Other variations, modifications and embodiments will be apparent to the skilled person and are intended to form part of the invention.

The invention claimed is:

1. A method of preparing or operating a mass spectrometer vacuum interface comprising a skimmer apparatus having a skimmer aperture and an internal surface of the skimmer apparatus, the method comprising the step of disposing an adsorbent or getter material on the internal surface towards the downstream end and away from the skimmer aperture.

2. The method of claim 1, wherein the internal surface comprises a deposition region where matter from previous or present plasma flows may be deposited and the adsorbent or getter material is disposed on at least a part of at least the deposition region of the internal surface.

3. The method of claim 1, wherein the disposing step is performed before a first use of the skimmer apparatus.

4. The method of claim 1, wherein the disposing step is performed after at least a first use of the skimmer apparatus.

5. The method of claim 3, wherein the disposing step is performed intermittently to refresh a previously disposed adsorbent or getter material.

6. The method of claim 1, wherein the adsorbent or getter material is provided as a thin film.

7. The method of claim 6, wherein the thin film has a monolayer, or approaching monolayer, thickness.

8. The method of claim 1, wherein the adsorbent or getter material is disposed by sputtering or sublimation thereof onto the internal surface.

9. The method of claim 8, wherein the adsorbent or getter material is disposed by applying local heating to one or more filaments, rods or pellets of the adsorbent or getter material inside the skimmer apparatus.

10. The method of claim 1, wherein the adsorbent or getter material is disposed by mechanical introduction of the material into the expanding plasma.

11. The method of claim 1, wherein the adsorbent or getter material is titanium.

12. The method of claim 1, wherein the adsorbent or getter material comprises one or more of a metal, glass, evaporable getters, non-evaporable getters, ceramics material, zeolites, zeolites with a getter material, getter-covered sponge, aluminium sponge, and carbon or activated carbon.

13. The method of claim 1, further comprising the steps of:

skimming an expanding plasma through the skimmer aperture, and separating within the skimmer apparatus a portion of the skimmed plasma adjacent the skimmer apparatus from the remainder of the skimmed plasma by collection of the portion by the adsorbent or getter material.

14. A skimmer apparatus for a mass spectrometer vacuum interface, the skimmer apparatus comprising:

an internal surface and a skimmer aperture for skimming plasma therethrough to provide skimmed plasma downstream of the skimmer aperture; and an adsorbent or getter material disposed on the internal surface of the skimmer apparatus towards the downstream end and away from the skimmer aperture.

15. The apparatus of claim 14, wherein the internal surface comprises a deposition region where matter from previous or present plasma flows may be deposited and the adsorbent or getter material is disposed on at least a part of at least the deposition region of the internal surface.

16. The apparatus of claim 14, wherein the adsorbent or getter material is disposed on the internal surface of an unused skimmer apparatus.

17. The apparatus of claim 14, wherein the adsorbent or getter material is disposed on the internal surface of a used skimmer apparatus.

18. The apparatus of claim 17, further comprising means for disposing an adsorbent or getter material on the internal surface intermittently to refresh a previously disposed adsorbent or getter material.

19. The apparatus of claim 14, wherein the adsorbent or getter material is a thin film.

20. The apparatus of claim 19, wherein the thin film has a monolayer, or approaching monolayer, thickness.

21. The apparatus of claim 14, wherein the adsorbent or getter material is titanium.

22. The apparatus of claim 14, wherein the adsorbent or getter material comprises one or more of a metal, glass, evaporable getters, non-evaporable getters, ceramics material, zeolites, zeolites with a getter material, getter-covered sponge, aluminium sponge, and carbon or activated carbon.

* * * * *